United States Patent [19]

McDonald et al.

[11] Patent Number: 5,794,151

[45] Date of Patent: Aug. 11, 1998

[54] FREQUENCY ALLOCATION FOR SHARED SPECTRUM TRANSMITTER BASED ON LOCATION

[75] Inventors: James A. McDonald, Buffalo Grove; Thomas A. Freeburg, Arlington Heights; Ross E. Ruthenberg, WoodDale, all of Ill.; Thomas V. D'Amico, Boca Raton, Fla.

[73] Assignee: Motorola, Inc., Schaumburg, Ill.

[21] Appl. No.: 577,318

[22] Filed: Dec. 22, 1995

[51] Int. Cl.$^6$ .............................. H04M 11/00; H04Q 7/30
[52] U.S. Cl. .............................. 455/454; 454/63; 454/426
[58] Field of Search .............................. 455/33.1, 34.1, 455/34.2, 62, 63, 426, 446, 448, 450, 454, 456, 507; 379/59, 60; 370/329; 342/352, 357

[56] References Cited

U.S. PATENT DOCUMENTS

| | | |
|---|---|---|
| 4,790,000 | 12/1988 | Kinosihta . |
| 5,227,802 | 7/1993 | Pullman et al. ............ 342/352 |
| 5,335,278 | 8/1994 | Matchett et al. . |
| 5,410,737 | 4/1995 | Jones ............ 455/34.1 |
| 5,422,930 | 6/1995 | McDonald et al. . |
| 5,425,030 | 6/1995 | Comroe et al. ............ 455/34.1 |
| 5,428,668 | 6/1995 | Dent et al. ............ 379/59 |
| 5,448,754 | 9/1995 | Ho et al. ............ 455/34.1 |
| 5,475,866 | 12/1995 | Ruthenberg ............ 455/34.1 |
| 5,483,666 | 1/1996 | Yamada et al. ............ 455/34.1 |
| 5,546,445 | 8/1996 | Dennison et al. ............ 379/60 |
| 5,548,809 | 8/1996 | Lemson ............ 455/34.1 |

OTHER PUBLICATIONS

"Personal Communications Services Spectrum Sharing with Private Microwave Services at 1850–1990MHz", Motorola, Inc., Jun. 1991.

*Primary Examiner*—Nguyen Vo
*Assistant Examiner*—Lester G. Kincaid
*Attorney, Agent, or Firm*—Hugh C. Dunlop

[57] ABSTRACT

A shared spectrum communications unit and system provides communications without interfering with incumbent point-to-point receivers. This system includes a transmitter (e.g., of a PCS device) and a geographical location device which is operatively associated with the transmitter. The geographical locating device determines the position of the transmitter, and provides position information to a frequency authorization device. Geographical information pertaining to the PCS device is compared with the locations of the incumbent point-to-point receivers, using a database of the frequency authorization device including the locations of the point-to-point receivers, and a frequency allocation/authorization is generated to the PCS device when the PCS device is located outside of a predetermined range associated with local point-to-point receivers. An authorized frequency is stored and employed by the frequency authorization device for control of the operating frequency of the PCS device.

23 Claims, 1 Drawing Sheet

FREQUENCY ALLOCATION FOR SHARED SPECTRUM TRANSMITTER BASED ON LOCATION

BACKGROUND OF THE INVENTION

The present invention relates to communication systems and, more particularly, a system and method for shared spectrum frequency use which avoids interfering with point to point receivers.

Many wireless communication devices are currently in use and wireless communication systems continue to expand at a dramatic rate. Along with the increased use is the need for available bandwidths in order to handle all the communications traffic. The drive to use more wireless communications has forced more efficient use and seeking out of unused portions of already assigned bandwidths.

For example, the point-to-point microwave spectrum (approximately 1.9 GHz (gigahertz) utilizes only a portion of the spectrum in any one geographic location. As such, there are substantial unused segments of the point-to-point microwave spectrum which could be used for other purposes. Recognizing this fact, the FCC (U.S. Federal Communications Commission) has ruled that certain bands near or within the point-to-point microwave may be used for unlicensed personal communication systems (PCS) services as long as these PCS systems meet certain rules of protocol to prevent interference with point-to-point microwave systems. These PCS systems provide short range, low power communications within the unlicensed PCS bands.

The rules of protocol raise problems which must be solved before using these bandwidths. The protocol restricts the PCS systems from operating in areas or in ways which would interfere with existing point-to-point microwave systems. Existing point-to-point microwave systems which are assigned to specific geographic areas are the incumbent point-to-point microwave receivers or incumbent users in the specific bandwidth in that area. As such, there is a need to allocate and coordinate the unlicensed bands based on the geographical location of the PCS systems relative to the incumbent users. While it appears that the FCC may, at some time in the future, transfer the incumbent point-to-point systems to other bands, this is not expected to happen in the near future and thus current PCS systems must overcome the problems associated with operating in the unlicensed bands near 1.9 GHz.

Each point-to-point microwave receiver operates within a limited range which may include a radius of one mile and a bore sight of the point-to-point receiver antenna having a range of several miles. Since such receivers operate on a point-to-point basis, the geographical areas which need to be excluded are generally determinable. As such, it would be desirable to provide an apparatus and method which can authorize frequencies to PCS systems based on the available information regarding local point-to-point receivers. Such information may be regarding as an "exclusion zone" in which the PCS system is prohibited from operating.

Some techniques of determining and authorizing operating frequencies to PCS systems include connection of one end of the PCS system to a hard wired, twisted pair, telephone line. One such example of this approach may be found in U.S. Pat. No. 5,422,930 to McDonald et al., which is incorporated herein by this reference. The telephone line connection links the PCS system to a station which will reference the point-to-point microwave receivers in the general local of the telephone point to which the PCS system is connected. The operating frequency is entered into the PCS system, thereby assigning an operating frequency based on the geographic location. However, this geographical location technique is limited to system architectures where a telephone number is assigned to the base station such that the location of the base can be determined based on the telephone number or exchange.

There are, however, many communications systems that do not require the use of an assigned telephone number. Thus, the above technique would not provide the required capability in many different systems. A need therefore remains for an improved system that meets these and other problems.

BRIEF DESCRIPTION OF THE DRAWINGS

The invention may be understood by reference to the following embodiments thereof, which embodiments are described below and illustrated by the accompanying drawings, in which.

DETAILED DESCRIPTION OF AN EMBODIMENT

These problems and others are solved by the improved method and system according to the invention. A presently preferred embodiment is a shared spectrum communications system which provides communications and frequencies, e.g., in the 1.9 GHz band, which avoids interfering with incumbent point-to-point receivers of another communication system. This system may include a communication system (e.g., a PCS) transmitter and a geographical locating device which is operatively associated with the PCS transmitter. The geographical locating device determines the position of the PCS transmitter, and provides position information to a frequency authorization device. Geographical information pertaining to the PCS device is compared with the locations of the incumbent point-to-point receivers, using a database of the frequency authorization device including the locations of the point-to-point receivers, and a frequency allocation/authorization is generated to the PCS device when the PCS device is located outside of a predetermined zone (e.g., a range or other measure in keeping with the exclusion zone) associated with local point-to-point receivers. An authorized frequency is stored and employed by the frequency authorization device for control of the operating frequency of the PCS device. Thus, when employed this system prevents interference with incumbent point-to-point receivers, and preferably advantageously without the requirement of a telephone connection to achieve the location determination and authorization.

Figure 1:
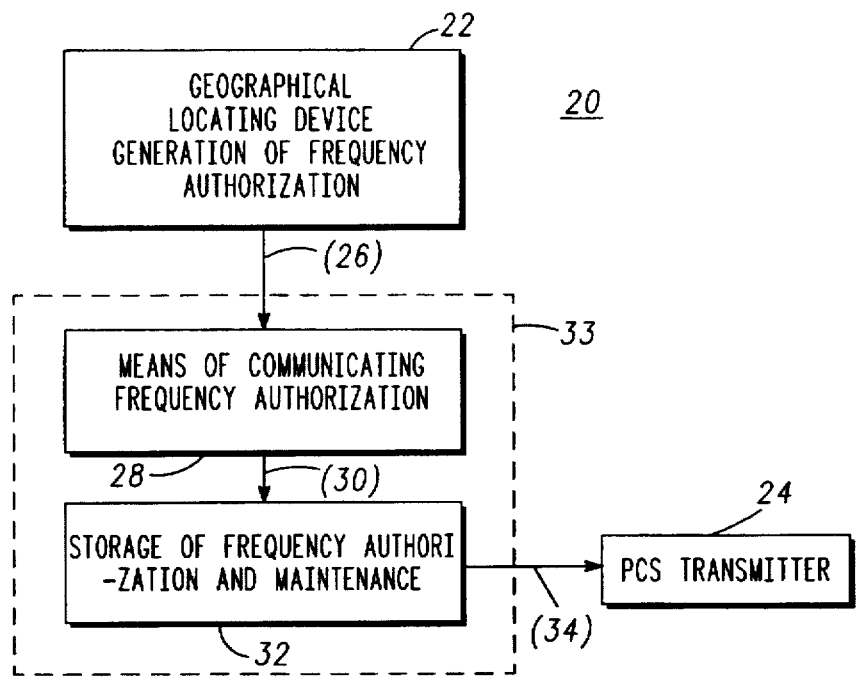
FIG. 1 is a schematic diagram showing a generalized embodiment of the apparatus and method of the claimed invention.

Turning now to FIG. 1, a first generalized embodiment is provided in which a shared spectrum communications system 20 is capable of communicating in shared spectrum with incumbent point-to-point transceivers, such as are found in frequencies on the order of 1.9 GHz in the United States. A wireless connection is provided between a geographic locating device 22 and a transmitter (e.g., a PCS transmitter) 24. The geographical locating device 22 is coupled 26, e.g., by non-wireline transmission means, to frequency authorization communicating device 28 which is coupled 30 to frequency storage device 32. The frequency authorization communicating device 28 and the storage device 32 comprise the frequency authorization means 33. The storage device 32 is coupled 34 to the PCS transmitter 24.

Figure 2:
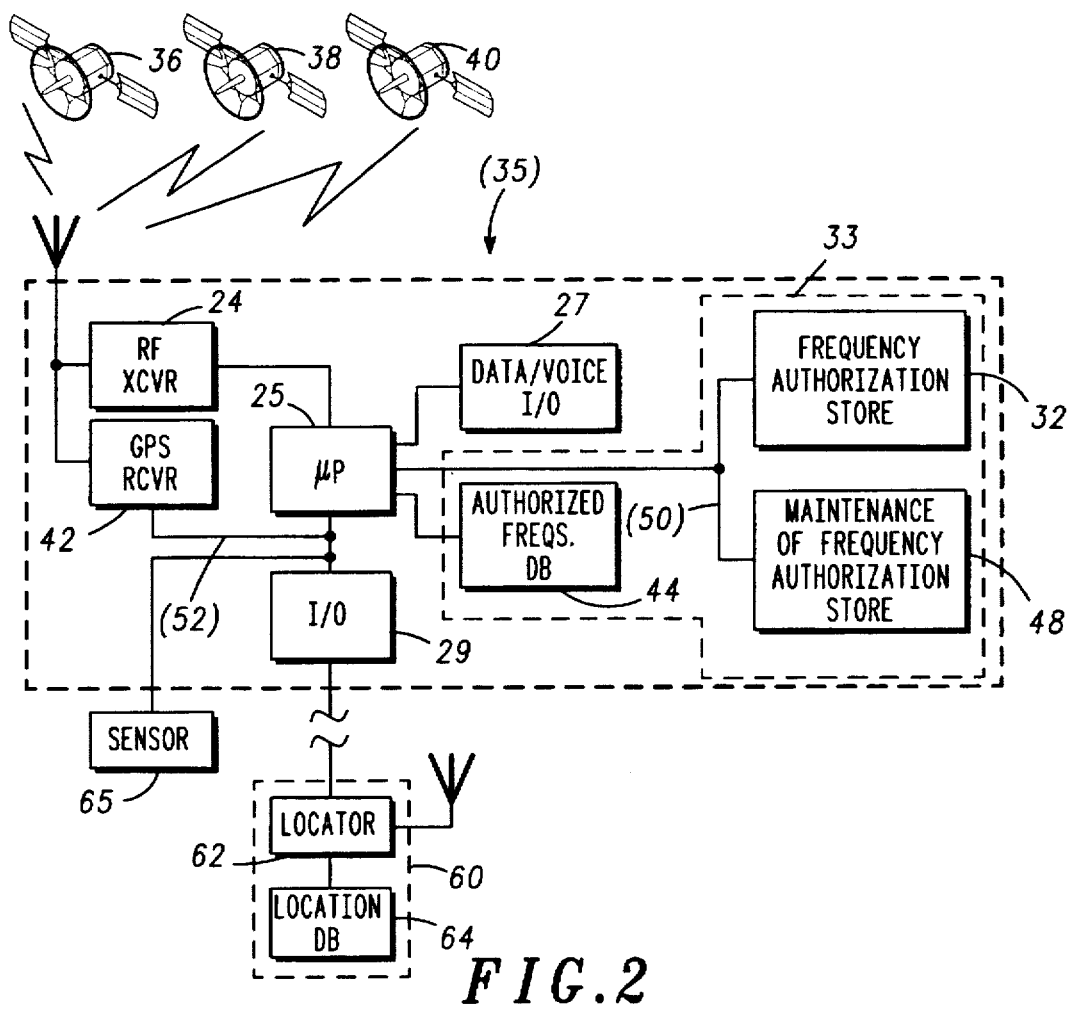
FIG. 2 is a schematic diagram of a more specific embodiment of the claimed invention employing a global positioning system receiver for determining the geographical location of a PCS transmitter associated therewith.

With reference to FIG. 2, a more specific embodiment of the present invention is illustrated. The system of communication unit 35 as shown in FIG. 2 incorporates a global positioning system (GPS) receiver of known construction as part of the geographical locating device 22 of FIG. 1. The geographical locating device 22 here includes the GPS system includes a network of GPS satellites 36,38,40, and the subscriber GPS receiver 42. The global positioning system provides a satellite navigation system which incorporates numerous satellites in three sets of orbits to provide precise three dimensional geographic coordinates. The GPS system permits triangulation of the position of the GPS receiver 42 relative to three satellites 36,38,40 to provide the three dimensional coordinates of the communication unit 35. As such, a GPS system employed as the geographical locating device 22 will provide highly precise geographical positioning to assure highly accurate location identification to maximize the accuracy of the frequency authorization.

At this point, it should be noted that other forms of geographical locating devices 22 are considered to be included within the scope of the claimed invention. In this regard, the geographical locating device may also comprise a separate GPS receiver unit 60 with a receiver (locator 62) and location database 64, capable of outputting location information for use by communication unit 35. In this case, communication unit 35 is equipped with an I/O (input/output) device 29 which can be either manual or automatic, depending on the interface design chosen for communication unit 35, through which the location information from unit 60 can be input to processor 25 of unit 35 for further processing. A detachable unit 60 is advantageous in situations, e.g., where a GPS signal cannot be received (e.g., some interior portions of buildings), and authorized user can obtain the location information from a proximate reception area and use I/O 29 to input the approximate location data. Further, it should be appreciated that other types of receivers may be substituted for receiver 42 of locator 62. For example, where a Loran-C type radio-navigation system of known construction, employing two types of ground stations transmitting pulsed signals for location determination, is used the receivers will be Loran-C capable. Alternatively, other rf (radio frequency) systems may be used in location determination. For example, where precise enough location information may be obtained from a local cellular or paging rf system, either a separate locator 60 (e.g., a subscriber unit capable of outputting its location to the user) or communication unit 35 itself, if capabilities via rf transceiver 24 exist, can be used in determining location. Thus, for example by the cellular infrastructure determining the location of the subscriber device and communicating this information back, or by the subscriber unit maintaining a listing of infrastructure base station locations and determining its location from known identifiers in base station broadcasts, the location can be determined. In yet another alternative approach, the locator 62 could simply be a processor with appropriate programming, the store 64 including location tables for address information and current point-to-point exclusion zones by frequency. Thus, manual authorization could be effected by an authorized person being provided with location information about communication unit 35 (e.g., street address of the building it is in, map coordinates, GPS readings, etc.) and inputting this location information to unit 60 (e.g., a server or other computer). The unit 60 would then output authorization information (e.g., excluded frequencies, or alternatively authorized frequencies), which the authorized person would then effect the inputting of to communication unit 35 (e.g., either in person or via further communication to a user to input along with a authorization code).

Yet one more embodiment of the geographical locating device 22 includes the use of television/radio broadcast signals. A geographical locating device 60 is provided which monitors the broadcast spectrum to determine the magnitude of the local signals by a variety of characteristics. In this embodiment, a database 64 is provided in the geographical locating device which includes tables of the various broadcast signals based on the geographical areas to map the location of the geographical locating device 60. The monitored signals are compared to the database to identify the location of the geographical locating device 60 and hence the associated PCS transmitter 24. This technique is particularly useful in areas where there are few or no point-to-point microwave incumbent receivers and thus transmissions since a highly precise geographical location is not required. With this in mind, the GPS system and the Loran-C embodiments of the geographical locating device 22 are preferred when there is a requirement for highly precise geographical locating.

In determining the authorization, one may additionally take into account various transmission characteristics of the communication unit before generating the authorization. Thus, if the communication unit will be transmitting via a directional antenna, inside a building, with a known maximum power, or similar predetermined characteristics, one may optimize frequency sharing by determining the maximum interference caused by a transmitter with these characteristics, not just a generalized case (e.g., transmitting via an omni antenna, etc.). Thus, even multiple wireless links (e.g., via repeaters, or over a wireless LAN (local area network) may be authorized, as long as care is taken to ensure that the range that would be achieved with multiple wireless communications links would not be great enough to allow authorization to extend into the exclusion zone of a receiver of an incumbent point to point link. Thus, if the range expectation of a wireless link was 100 feet and the nearest exclusion zone was 5 miles, then many successive wireless links could be utilized in relaying the authorization. It would be incumbent on the system operator to limit the number of successive links that the authorization might be transferred in accordance with the requirement to prevent interference to the incumbent microwave link.

With further reference to FIG. 2, once the GPS receiver 42 acquires a geographical location, the information is transmitted 52 to the frequency authorization generator/means 25, 33. The frequency authorization means 25, 33 includes processor 25 and the databases 32, 44 and 48. Authorized frequency database 44 has a list of locations of incumbent point-to-point receivers (which may be kept up-to-date by any appropriate means—e.g., inputting or downloading, with a timer set on any version's life span, if desired). The geographical location information is compared to the database 44 information to determine the frequency range at which the PCS transmitter 24 may operate without interfering with incumbent point-to-point receivers, if any. The processor 25 then allocates and stores a frequency for use by the specifically located PCS transmitter 24, storing the authorized frequency in the authorization frequency storage means 32. The frequency authorization means 25, 33 is coupled to the transmitter 24 to control transmitter 24 to communicate on only the authorized frequency or frequencies.

Preferably, from time to time, means for polling in the form of a frequency maintenance unit or store 48 is activated/accessed to poll or verify the geographical position of the PCS transmitter 24, or otherwise verify there has been no change in location since the last location certification. For instance, in the situation where the location certification was provided manually by an authorized person, the certification would remain intact until the device was moved. If this device was a file server or another permanently installed element of a computer system, then movement would be infrequent, if at all, and relatively easy to determine if it occurs.

Accordingly, means for polling a geographical position of the communications system transmitter are provided. The means for polling preferably comprise a means (in the form of unit 65) for detecting a change in the geographical position of the geographical locating device. The means for detecting a change in the geographical position may comprise a proximity sensor, an accelerometer, a pendulum, a gyroscope, mechanical interlocks or electrical interlocks. The means for detecting may be operable for disconnecting the transmitter from a power source and may be further operable for disconnecting from a telephone line power source or an alternating current power source.

The authorization maintenance unit 48 is coupled 50 to the frequency authorization storage unit 32 and is coupled (52) to the GPS receiver 42 or other forms of geographical location like unit 60. This authorization maintenance unit 48 will employ the GPS receiver 42 or other geographical location means associated with the selected system to determine the geographical location of the associated transmitter 24/communication unit 35. The geographical position is verified, e.g., in the manner as set forth above, and the location is checked against the previous location before reauthorizing the frequency of the transmitter 24. If the geographical location is the same as when the frequency was authorized or within a predetermined range, the authorized frequency may be maintained. However, if during the period of time between the prior authorization and the subsequent maintenance check, the store 44 is updated to incorporate additional point-to-point receivers within the general locale (e.g., some predetermined range, or region) of the transmitter 24/communication unit 35, the frequency may have to be reauthorized. In this manner, the present system 20 assures that the frequency is maintained in a generally current status to prevent interfering with incumbent point-to-point receivers. The maintenance phase may occur on a daily, weekly, monthly or perhaps quarterly basis as deemed necessary based on a variety of characteristics, including the pace of change in use in the shared spectrum.

Also, while the authorized frequency will be stored in a memory device of known construction, it is envisioned that this memory device will not be volatile. However, there will be certain circumstances in which it is required that the authorization be canceled. When the authorization is canceled, the previously stored authorization will be removed from the memory and thereby requiring reauthorization, e.g., in the manner as set forth above. Additionally, device(s) 65 may be associated with the maintenance unit 48 which would trigger or signal that a reauthorization must occur. Such device(s) 65 may include, e.g., proximity sensors, power disconnection sensors, accelerometers, gyroscopic or other movement detection sensors, or device switches such as mechanical or electrical interlocks which will signal when the communication unit 35 is moved or components of the communication unit 35 or device 65 are accessed. As such, after the occurrence of at least one of perhaps a variety of circumstances relative to the transmitter 24 or processor 25, the transmitter 24 will be shutdown, at least in all shared spectrum, and the maintenance device 48 will reacquire the geographical position of the associated transmitter 24 to authorize an appropriate frequency based on the information retained in the database 44.

While a preferred embodiment of the present invention has been shown and described, a skilled artisan will appreciate that there are many variations that are possible for the present invention, only a limited number of which have been described in detail above. Thus, for example, while the embodiment above describes application to elements described in terms of specific logical/functional/circuitry relationships, one skilled in the art will appreciate that such may be implemented in a variety of ways, e.g., by appropriately configured and programmed processors, ASICs (application specific integrated circuits), and DSPs (digital signal processors), but also by hardware components, or some combination thereof. Further, it should be understood that for purposes of this application a first device or component is responsive to, coupled to, or in communication with a second unit or component regardless of whether the first and second units are directly coupled or indirectly coupled, such as via intermediate units, including switches that operatively couple the units for only a segment of time, as long as a signal path can be found that directly or indirectly establishes a relationship between the first and second units. Moreover, while the embodiment describes application with respect to specific geographical location systems and incumbent point-to-point systems, it should be appreciated that the invention has application to many more types of systems. Thus, it should be understood that the invention is not limited by the foregoing description of a preferred embodiment, but embraces all such alterations, modifications, and variations in accordance with the spirit and scope of the appended claims.

We claim:

1. A communications device, for radio communication with a shared spectrum communications system, which avoids interfering with point-to-point receivers of another communication system, said device comprising:

a device transmitter, within said device;

a geographical locating device physically coupled to said device transmitter for determining the geographical position of said device transmitter;

means, within said device, physically coupled to and in communication with said geographical locating device for generating a frequency authorization, said frequency authorization generating means including a database within said device of locations of incumbent point-to-point receivers, said frequency authorization generating means receiving information from said geographical locating device and comparing the location of said device transmitter operatively associated with said geographical locating device to the locations of incumbent point-to-point receivers and automatically generating a frequency authorization within said device when said device is located outside of a predetermined zone associated with local incumbent point-to-point receivers;

means, within said device, in communication with said frequency authorization generating means for storing a frequency which is authorized by said frequency authorization generating means, said frequency storing means maintaining and employing said frequency authorized by said frequency authorization means for the control of the operating frequency of said device; and means, within said device, for transferring said frequency authorization from said frequency authorization generating means to said frequency storing means.

2. The system of claim 1, said geographical locating device comprising a global positioning system receiver.

3. The system of claim 1, said geographical locating device comprising a Loran-C device.

4. The system of claim 1, said geographical locating device comprising a manual authorization device.

5. The system of claim 1, said geographical locating device comprising a broadcast signal receiver.

6. The system of claim 1, said geographical locating device comprising a radio frequency communications device.

7. The system of claim 1, further comprising means for polling a geographical position of the device transmitter.

8. The system of claim 7, wherein the means for polling comprises means for detecting a change in the geographical position of said geographical locating device.

9. The system of claim 8, wherein the means for detecting is selected from a group consisting of:

a proximity sensor;

an accelerometer;

a pendulum;

a gyroscope;

mechanical interlocks; and electrical interlocks.

10. The system of claim 9, wherein the means for detecting is further operable for disconnecting the transmitter from a power source.

11. The system of claim 10, wherein the means for detecting is further operable for disconnecting from a power source selected from a group consisting of:

a telephone line; and alternating current power.

12. The system of claim 8, wherein the means for detecting said change in the geographical position of said geographical locating device operatively associated with said device transmitter includes means for disabling the device transmitter.

13. The system of claim 12, wherein the means for disabling the device transmitter includes means for reauquiring a geographical position of the device transmitter in order to reauthorize said frequency.

14. The system of claim 1, wherein the geographical locating device is further operable for re-evaluating the position of the device transmitter.

15. The system of claim 14, wherein the geographical locating device is further operable for detecting a change in the geographical position of said geographical locating device.

16. The system of claim 1, wherein the means for generating is further operable for relaying the frequency authorization via a predetermined number of wireless links in the communications system.

17. A communications unit which avoids interfering with incumbent point-to-point receivers, said communications unit comprising:

a transmitter within said unit;

a global positioning system (GPS) receiver for determining the geographical position of said communications unit;

a processor within said unit, physically connected to and in communication with the transmitter and GPS receiver, operable as a frequency authorization generator operatively associated with a database, within said unit, of locations of incumbent point-to-point receivers, said frequency authorization generator receiving information from said GPS receiver for comparing the location of said transmitter to incumbent locations of point-to-point receivers and automatically generating a frequency authorization when said communications unit is outside of any predetermined region associated with said point-to-point receivers; and a frequency store, within said unit, coupled to said frequency authorization generator for storing a frequency which is authorized by said frequency authorization generator, said frequency store maintaining and employing said frequency authorized by said frequency authorization generator for the control of the operating frequency of said communications unit.

18. A method of operating a shared spectrum communications unit which avoids interfering with incumbent point-to-point receivers, said method comprising the steps of:

providing, within said communications unit, a communications system transmitter;

providing a geographical locating device physically and operatively associated with said communications unit;

providing, within said communications unit, a database of locations of incumbent point-to-point receivers;

determining, within said communications unit, the geographical position of said communications unit using said geographical locating device;

comparing, within said communications unit, said geographical position with said database of locations of incumbent point-to-point receivers;

authorizing, within said communications unit, an operating frequency also used by an incumbent point-to-point receiver for use by said communications system transmitter based on the comparison of said geographical location of said communications unit when the geographical location of said communications unit is outside of a predetermined region associated with said point-to-point receiver; and storing, within said communications unit, the operating frequency authorized for use by said communications system transmitter.

19. The method of claim 18, further comprising the step of:

using a global positioning system receiver for determining the geographic location of said communications unit.

20. The method of claim 18, further comprising the step of:

using a Loran-C device for determining the geographic location of said communications unit.

21. The method of claim 18, further comprising the step of:

using a manual authorization device for determining the geographic location of said communications unit.

22. The method of claim 18, further comprising the step of:

using a broadcast signal receiver for determining the geographic location of said communications unit.

23. The method of claim 18, further comprising the step of:

using a radio frequency communications device for determining the geographic location of said communications unit.

* * * * *